United States Patent [19]
DeVita

[11] Patent Number: 4,985,218
[45] Date of Patent: Jan. 15, 1991

[54] PROCESS AND INJECTOR FOR REDUCING THE CONCENTRATION OF POLLUTANTS IN AN EFFLUENT

[75] Inventor: Vincent A. DeVita, Stamford, Conn.
[73] Assignee: Fuel Tech, Inc., Stamford, Conn.
[21] Appl. No.: 319,173
[22] Filed: Mar. 3, 1989
[51] Int. Cl.$^5$ ............................................. B01D 53/34
[52] U.S. Cl. .................................................. 423/235
[58] Field of Search ........................... 423/235, 235 D; 261/78.2, DIG. 76; 239/416.4, 416.5, 417.3, 434

[56] References Cited
U.S. PATENT DOCUMENTS

| | | | |
|---|---|---|---|
| 500,005 | 5/1893 | Jones | 239/417.3 |
| 3,299,940 | 1/1967 | Phillips et al. | 239/434 |
| 3,894,141 | 7/1975 | Moser | 423/235 |
| 4,719,092 | 1/1988 | Bowers | 423/235 |
| 4,726,934 | 2/1988 | Yates et al. | 239/434 |
| 4,751,065 | 6/1988 | Bowers | 423/235 |
| 4,770,863 | 9/1988 | Epperly et al. | 423/235 |
| 4,777,024 | 10/1988 | Epperly et al. | 423/235 |
| 4,842,834 | 6/1989 | Burton | 423/235 |

Primary Examiner—Jeffrey E. Russel
Attorney, Agent, or Firm—St. Onge Steward Johnston & Reens

[57] ABSTRACT

A process and apparatus for reducing the concentration of pollutants in an effluent from the combustion of a fuel or waste material is presented. The process and apparatus enables injection of an effluent treatment fluid at low treatment fluid flow rates yet provides an even dispersion of treatment fluid within an effluent passage with little or no clogging. An atomization conduit, positioned coaxially within a treatment fluid supply conduit, extends into the effluent and supplies an atomization fluid, such as steam or air. A treatment fluid is supplied through a supply conduit and through at least one jet in the atomization conduit wall at a velocity of between 2-60 feet per second, causing atomization of the treatment fluid within the nozzle.

16 Claims, 4 Drawing Sheets

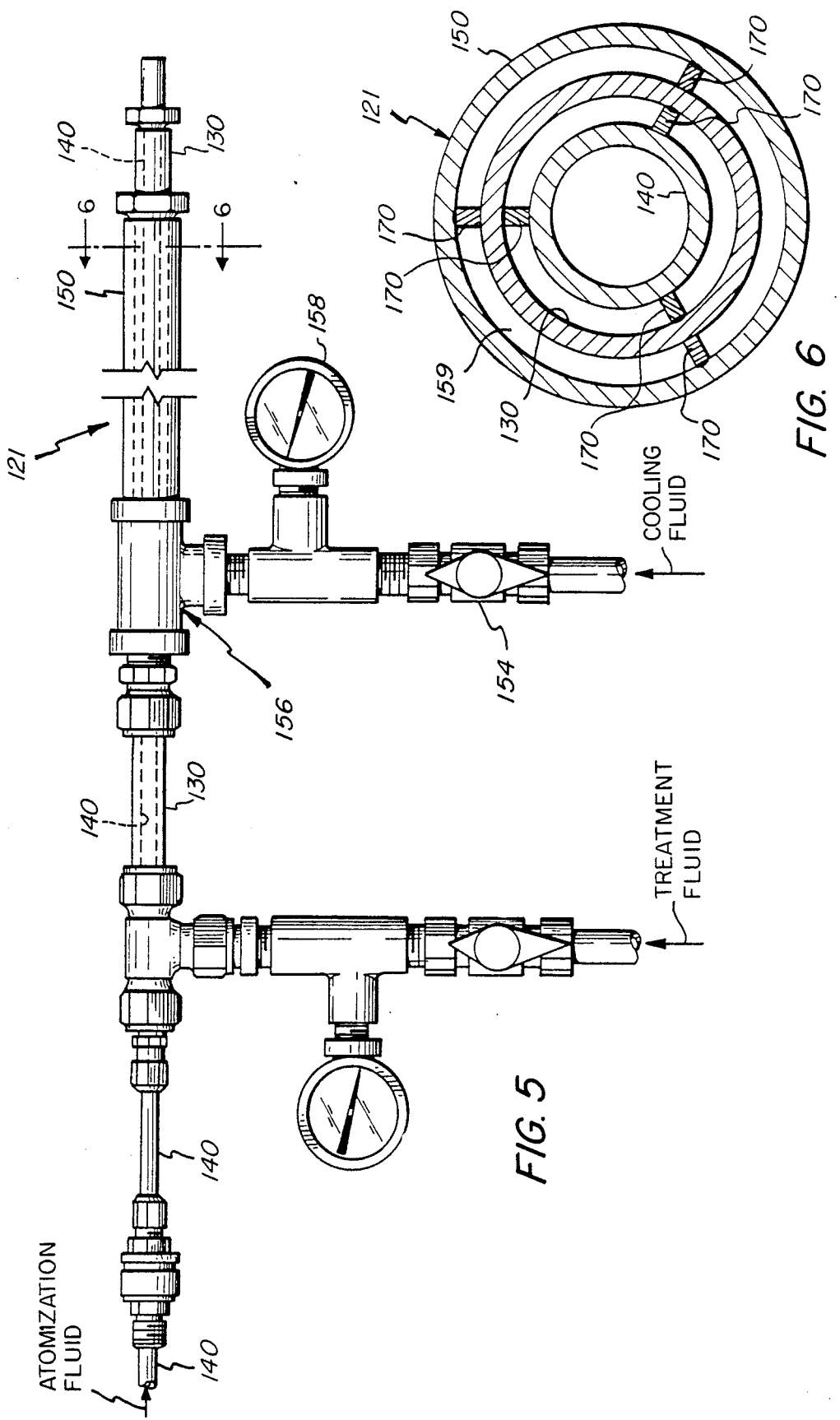

PROCESS AND INJECTOR FOR REDUCING THE CONCENTRATION OF POLLUTANTS IN AN EFFLUENT

This is a Divisional Application of application Ser. No. 07/160,684, filed on Feb. 26, 1988, now abandoned.

TECHNICAL FIELD

The present invention relates to the reduction of pollutants, such as nitrogen oxides in an effluent, generated by the combustion of carbonaceous fuels and waste materials. More particularly, this invention relates to a process and injector therefor.

BACKGROUND OF THE INVENTION

An effluent treatment system designed for maximum pollutant removal will use a staged injection system in which treatment fluids are injected at several different points in the path of the combustion effluent. This is disclosed in commonly owned U.S. Pat. No. 4,777,024 to Epperly, Peter-Hoblyn, Shulof and Sullivan, entitled "Multi-Stage Process for Reducing the Concentration of Pollutants in an Effluent," and U.S. Pat. No. 4,780,289 in the name of Epperly, O'Leary and Sullivan and titled "Process for Nitrogen Oxides Reduction and Minimization of the Production of Other Pollutants," the disclosures of which are hereby incorporated by reference. Each stage will have different treatment fluid requirements as the pollutant concentration and effluent temperature varies as the effluent progresses through the combustion chamber and past several heat exchangers. Each stage of a treatment system requires a treatment fluid and treatment fluid injector appropriate for the treatment fluid flow rate and the conditions of the combustion chamber.

A particular problem encountered in designing injector systems for certain locations is providing a uniform distribution of treatment fluid across the path of the effluent. In a typical retrofit application, an injector should be able to generate droplets in a selected size range and distribute them uniformly across the boiler cross-section.

Uniform distribution of treatment fluid is most difficult to achieve where relatively low flow rates of treatment fluid are being injected, for example, in the third or fourth stage of a treatment system, where there may be fewer pollutants in the effluent stream. In this situation, it is necessary to contact a sufficient amount of treatment fluid with all of the effluent to reduce the pollutants, yet not to saturate even a portion of the gas stream with chemicals which could increase the pollutant level instead of reacting with the pollutants to reduce emissions. For example, a urea treatment fluid if injected in excessive quantities can cause excessive ammonia in the effluent stream. In prior art injectors such as a pin jet injector used to provide high penetration by a small jet of chemicals at low treatment fluid flow rates there can be a poor dispersion of the treatment fluid across the effluent path and particularly near the effluent passage wall from which the injector extends.

The problems facing the successful method and apparatus for injecting such compositions into an effluent are many. For instance, the heat of the effluent can readily cause a loss in structural integrity of most nozzles or their supports. When the composition to be injected is a solution, often precipitated solute will collect at the end of the nozzle and can plug the nozzle. A plugged nozzle on a treatment fluid injector is not merely an inconvenience: such plugging can render a treatment system ineffective, such that the combustion system does not comply with environmental regulations, necessitating the shut down of production facilities and the loss of time and money. Furthermore, the precipitated solute can break off as chunks and damage the interior of the boiler. Variability of droplet size, degree of dispersion and depth of penetration must be provided for by an injector, depending on the boiler configuration or boiler load. These problems have not been successfully addressed by the prior art.

The prior art relating to injection apparati and nozzles shows that such injection apparati are usually designed for a specific fluid and environment of use. Typically, the prior art teaches mixing of a liquid with an atomizing fluid at or near a nozzle tip, with the liquid being injected into the atomizing fluid at a point concentric within the atomizing fluid conduit. This external mixing of a liquid and atomization fluid can reduce clogging problems. However, this type of design does not allow for deep penetration of a broad band of droplet sizes into a chamber at low liquid flow rates. For example, U.S. Pat. No. 1,625,098, to Rudolph, (an atomizing cleaner) U.S. Pat. No. 3,876,150 to Dwyer (a paint spray nozzle) and U.S. Pat. No. 1,965,465 to Magowan (a liquid fuel burner) show this type of injector layout.

An internal mix injector nozzle, in which a liquid contacts an atomizing fluid before exiting from the nozzle tip, can give a finer control over penetration at low liquid flow rates. However, commercially available internal mix injector nozzles are extremely prone to rapid clogging in a combustion chamber application due to the precipitation of treatment chemicals in the nozzle.

The prior art thus does not teach an injector apparatus suitable for heavy duty use as in a combustion chamber and effluent passage, and which is useful for uniform delivery at low treatment fluid rates in a process for treating pollutants in an effluent stream.

There exists a present need, therefore, for an injection apparatus for injecting a treatment fluid, e.g., an aqueous solution of a $NO_x$ reducing composition into an effluent of the combustion of a carbonaceous fuel, which provides both good dispersion and penetration of injection fluid, and which reduces or eliminates plugging problems in an injector.

DISCLOSURE OF INVENTION

A process and injector apparatus for reducing the concentration of pollutants, such as nitrogen oxides, in an effluent from the combustion of a carbonaceous material is presented. The process comprises: positioning an injector within an effluent passage, where the injector includes an atomization conduit having an injector nozzle and at least one jet penetrating the wall of the atomization conduit upstream of the nozzle, and a supply conduit; supplying through the supply conduit and through the at least one jet an effluent treatment fluid; and supplying a carrier and atomization fluid through the atomization conduit to inject the solution into the effluent passage and preferably to effect further atomization of the solution prior to injection.

Preferably, the supply conduit is coaxial with and disposed around the atomization conduit. The at least one jet is preferably located upstream of the nozzle end at a distance equal to up to about thirty-two times the inner diameter of the atomization conduit, and most preferably at a distance equal to about five to sixteen times the inner diameter of the atomization conduit. Preferably there are two or more of such jets and most preferably there are two jets. The treatment fluid preferably comprises an aqueous solution of urea, ammonia, nitrogenated hydrocarbon, oxygenated hydrocarbon, hydrocarbon or combinations thereof.

The injector apparatus comprises: (a) means for providing an atomization fluid, having a nozzle for extending into an effluent passage; (b) means for supplying an effluent treatment fluid to the effluent passage, and (c) the treatment fluid supplying means being connected to the atomization fluid providing means by at least one jet upstream of the nozzle.

Preferably, the means for providing an atomization fluid comprises an atomization conduit and the at least one jet penetrates the wall of the atomization conduit. The means for supplying an effluent treatment fluid preferably comprises a supply conduit coaxial with and disposed around the atomization conduit. There are preferably two or more such jets, each being located in the atomization conduit upstream of the nozzle at a distance equal to up to about thirty-two times the inner diameter of the atomization conduit, and most preferably at a distance equal to about five to sixteen times the inner diameter of the atomization conduit. Most preferably, the two jets are oriented such that the treatment fluid streams entering the atomization conduit impinge on each other, further enhancing droplet formation. The atomization fluid is preferably provided in a flow of between about 200 to about 800 feet per second, and the effluent treatment fluid is supplied through the jets at a velocity of between about two to about sixty feet per second.

BRIEF DESCRIPTION OF THE DRAWINGS

The present invention will be better understood and its advantages more apparent in view of the following detailed description, especially when read with reference to the appended drawings, wherein:

FIG. 5 is a side elevation view of an alternate embodiment of the apparatus of the present invention; and FIG. 6 is a front cross-sectional view, taken along line 6—6 of FIG. 5.

Figure 1:
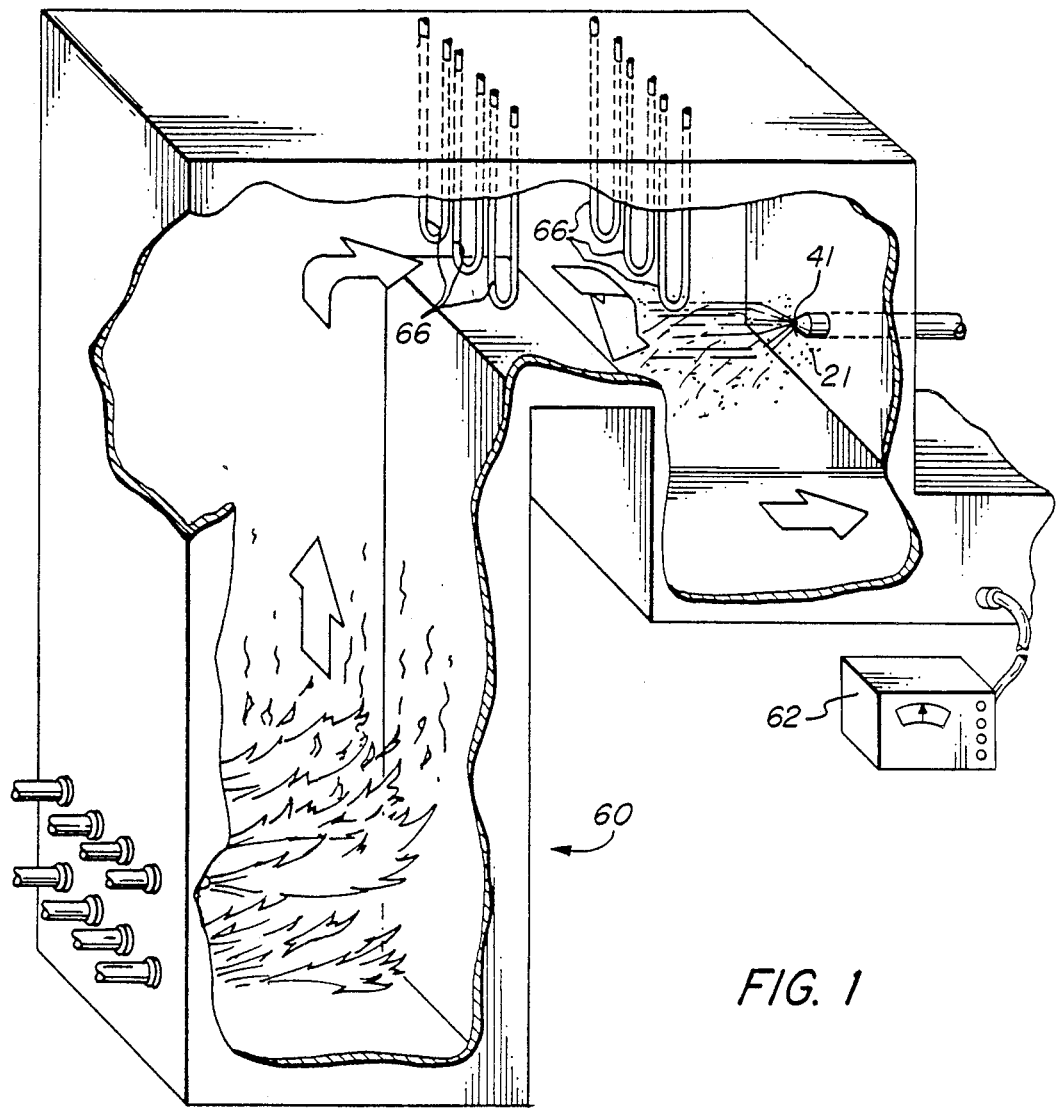
FIG. 1 is an installation schematic in perspective, partially broken away, of the apparatus of the present invention disposed in a utility boiler.

As used herein, the term "front" refers to the end of the apparatus which extends into the effluent; the term "rear" refers to the end of the apparatus from which the fluids and solutions may be supplied. Although this description is written in terms of the reduction of the nitrogen oxides concentration in an oxygen-rich effluent, it will be recognized that the apparatus of the present invention is equally applicable to any situation requiring the injection of an atomized fluid into a high temperature environment. Moreover, it will further be recognized that some or all of the Figures are schematic representations for purposes of illustration and do not necessarily depict the actual relative sizes or locations of the elements shown.

BEST MODE FOR CARRYING OUT THE INVENTION

The process and apparatus of the invention enable reduction of the concentration of nitrogen oxides, or other pollutants, in effluents from the combustion of a carbonaceous materials, including fuel per se and waste materials. Representative fuels are fuel oil, gas, coal, lignite and the like. Like numbered elements in the drawings refer to the same apparatus elements.

Figure 2:
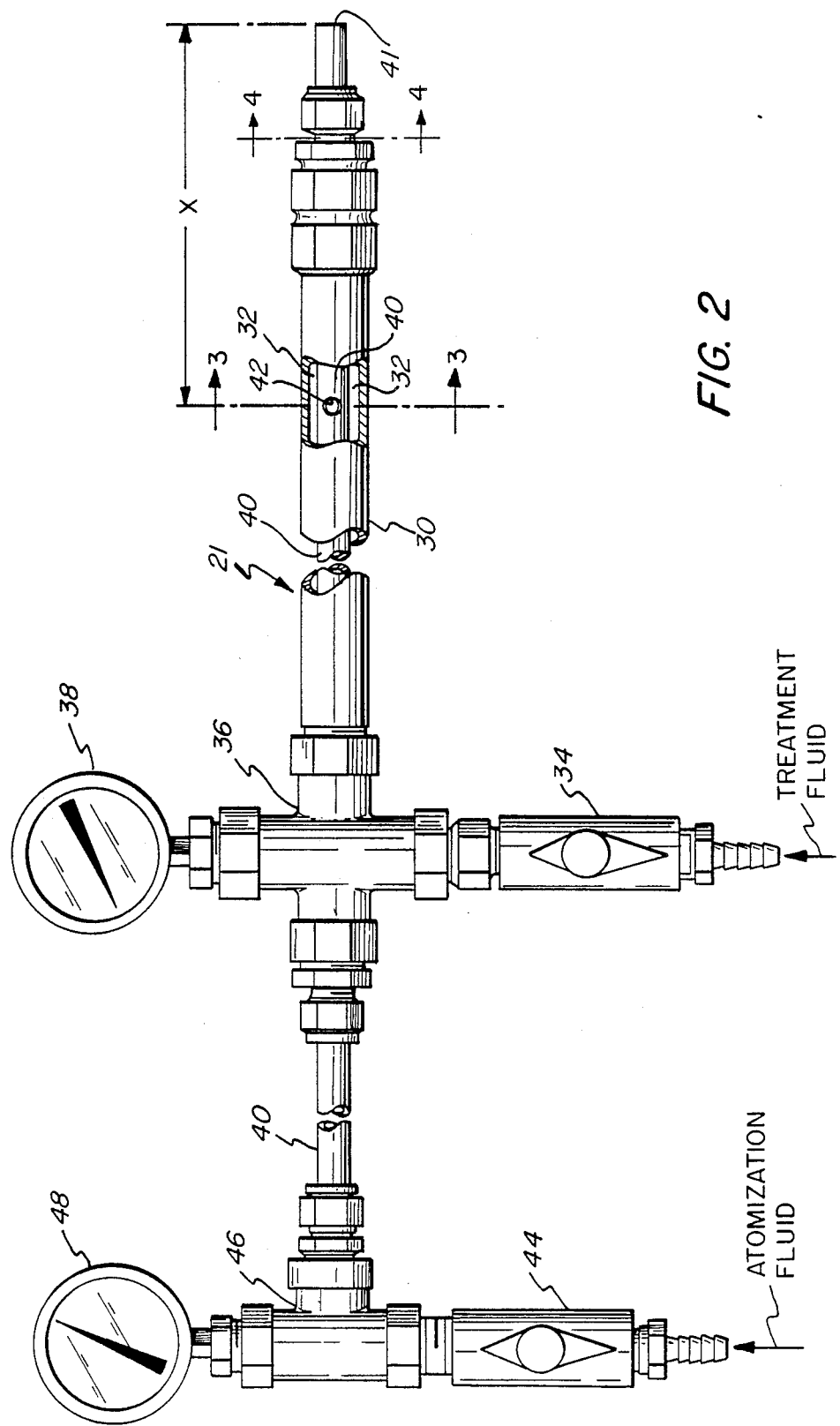
FIG. 2 is a side elevation view, partially broken away of the apparatus of the present invention.

As illustrated in FIGS. 1–4 the apparatus of this invention comprises an injector 21 comprising a supply conduit 30 which is operable to supply and inject a treatment fluid, such as a solution, through an annular space 32 into a high temperature environment, such as the effluent stream of a utility boiler 60 shown in FIG. 1. Supply conduit 30 may be any suitable conduit for this purpose and is advantageously a seamless tube of a temperature and corrosion resistant material such as a metal, especially temperature-resistant stainless steel. The treatment fluid to be injected through supply conduit 30 is supplied by any conventional supply or pumping device (not shown), as would be familiar to the skilled artisan, and is preferably supplied through a metering device to allow careful control of the amount of fluid injected. For example, as seen in FIG. 2, treatment fluid may be supplied by valve 34 to fitting 36 having a pressure gauge 38 for monitoring the treatment fluid delivery pressure.

Figure 3:
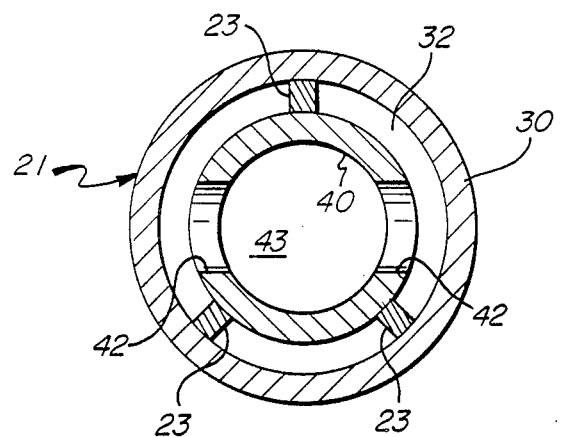
FIG. 3 is a cross-sectional view of the apparatus of the present invention taken across line 3—3 of FIG. 2.
Figure 4:
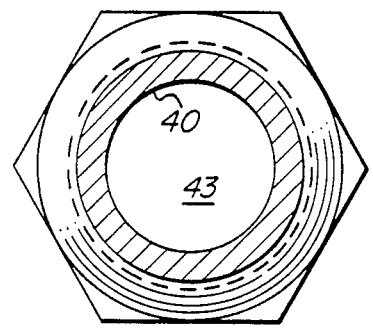
FIG. 4 is a cross-sectional view along the line 4—4 of FIG. 2.

Injector 21 of this invention further comprises an atomization conduit 40, as illustrated in FIG. 3, for supply of a carrier and atomization fluid therethrough. Atomization conduit 40 may be any suitable conduit operable to supply atomization fluid and is advantageously a seamless tube of a temperature resistant material such as a metal, especially temperature resistant stainless steel. The carrier and atomization fluid to be supplied through atomization conduit 40 may be any fluid operable to act as a carrier for treatment fluid droplets and preferably to cause atomization of the treatment fluid supplied through supply conduit 30. Supply conduit 30 is preferably coaxial with and disposed around atomization conduit 40, although the invention may also be practiced using separate, nonconcentric conduits.

As can be seen in FIGS. 2 and 3, at least one jet 42 penetrates the walls of atomization conduit 40 for feeding treatment fluid to space 43 in the atomization conduit 40 from the supply conduit 30. Preferably there are two or more such jets 42. Most preferably there are two such jets 42 located on opposite sides of atomization conduit 40 as shown in FIG. 3. In the preferred embodiment, jets 42 are located such that the streams of treatment fluid impinge on each other in space 43. Although jets 42 are shown as simple orifices in the walls of atomization conduit 40, it is to be understood that jets 42 may be any type of communicating conduit between supply conduit 30 and atomization conduit 40.

Atomization is primarily a function of velocity of the treatment fluid as it passes through the jets 42. Atomization is enhanced by locating jets 42 so that treatment fluid streams passing therethrough impinge on each, and further by the force of atomization fluid contacting the treatment fluid as it exits from jets 42. The velocity of treatment fluid through jets 42 can be varied by using jets of different sizes, by varying the pressure of the treatment fluid supplied to the jets 42 and by varying the flow rate of the atomization fluid. The force of atomization fluid contacting the treatment fluid can be varied by varying the flow of atomization fluid through atomization conduit 40, for instance by means of valve 44 as shown in FIG. 2.

Typically, the carrier and atomization fluid is steam or a gas, such as air, which is supplied to atomization conduit 40 from conventional means (not shown) through, valve 44 and fitting 46, the flow of which may be measured by gauge 48, all of which are shown in FIG. 2. Most preferably, the atomization fluid is steam. The atomization fluid is preferably provided at a gauge pressure of about five to about twenty pounds per square inch at flow rates from about 200 to about 800 feet per second. The treatment fluid is advantageously supplied at a flow rate and pressure which is higher than that of the pressure in the atomization conduit, and should be supplied at a pressure sufficient to produce a flow of treatment fluid through jets 42 at a velocity of between about two to about sixty feet per second; usually the treatment fluid will be supplied at a gauge pressure of about 10 to about 100 pounds per square inch. At this velocity, atomization of the treatment fluid takes place immediately upon introduction into the atomization conduit 40. Atomization is enhanced if the jets 42 are located so that the streams of treatment fluid passing through jets 42 impinge on each other. The carrier and atomization fluid also enhances atomization when supplied at higher velocities.

The carrier and atomization fluid will preferably project at least a portion of the droplets of treatment fluid to a distance of at least about 75% of the width of the flue gas passage at the point of injection, as illustrated in FIG. 1. Where it is feasible to position injectors on two sides of the flue gas passage, it is preferable that the injection extend only to about 50% of the width of the flue gas passage.

In selecting the size of jets 42, the practitioner must provide a jet large enough to allow a sufficient flow of treatment fluid to treat the effluent, and small enough so that the fluid velocity will be in the range of about two to about sixty feet per second. It has been found that for ½ inch diameter atomization conduit having a ⅜ inch inner diameter, that the diameter of jets 42 should be in the range of about 1/32 to about ¼ inch.

Referring now to FIG. 2, the dispersion of treatment fluid throughout the effluent is a function of the distance of the jets 42 to the nozzle tip 41 and of the force of the atomization fluid contacting the treatment fluid as it exits the jets 42. For example, a narrow dispersion may be obtained by locating jets 42 upstream of the nozzle tip 41 at a distance X equal to about thirty-two times the inner diameter of the atomization conduit 40. This jet to nozzle distance provides a narrow stream of treatment fluid similar to that provided by a pin jet; the depth of penetration of the stream can be varied by varying the atomization fluid flow rate. If distance X is selected to be equal to about sixteen times the inner diameter of the atomization conduit 40, a spray pattern in still air which has a conical first spray section adjacent the nozzle consisting primarily of small droplets and a cylindrical second spray section further away from the nozzle consisting of larger droplets is provided. A very broad spray pattern with a short travel is obtained by locating jets 42 adjacent to the nozzle tip 41.

If desired by the practitioner, as illustrated in FIG. 3, injector 21 of this invention may be provided with alignment tabs 23 to maintain atomization conduit 40 centrally disposed within supply conduit 30. Alignment tabs 23 may be placed intermittently along the length of atomization conduit 40. Alignment tabs 23 are preferably disposed on either the inside of supply conduit 30 or, more preferably, the outside of atomization conduit 40 and are advantageously attached by welding.

In an alternate embodiment of this invention, injector 121 shown in FIGS. 5 and 6 is provided with a cooling conduit 150 disposed outside of and around a portion of supply conduit 130. An appropriate cooling fluid such as air, water or steam may be circulated in annular space 159, to maintain the cooling of both atomization and supply conduits numbered as 140 and 130, respectively, in the high temperature environment of a boiler. Cooling fluid may be supplied to cooling conduit 150 from a suitable source (not shown) through, illustratively, appropriate valve 154 and fitting 156, and measured by gauge 158, as would be familiar to the skilled artisan. As desired, alignment tabs 170 as shown in FIG. 6 may also be provided between atomization conduit 130 and cooling conduit 150.

A significant advantage of this invention is that injector may provide a broad dispersion of droplets, i.e., a fog, as well as providing a range of droplet sizes. In addition, the flow of atomization fluid serves to prevent any particles from precipitating from the treatment fluid and collecting in the atomization conduit 40 or 140 where they might clog injector 21 or 121 and/or break off as a chunk and cause damage to the inside of a boiler. The flow of atomization fluid also serves to cool supply conduit 30 or 130 to reduce the chances of supply conduit failure.

The treatment fluid to be injected typically comprises a solution having at least one additive compound effective in reducing $NO_x$ and/or $SO_x$, under the conditions of injection. The temperature of the effluent at the point of injection, the concentration of the additive compound in the solution, and the size of the droplets in the dispersion, are selected to achieve reduction in nitrogen oxide or other pollutant levels in the effluent. The invention provides for treating higher temperature effluents, in the range of about 1350° F. to about 2200° F. by injecting an urea, ammonia or a nitrogenated hydrocarbon treatment solution, such as those disclosed and described in commonly assigned U.S. patent application Ser. No. 784,826 filed Oct. 4, 1985 in the name of Bowers and entitled "Reduction of Nitrogen and Carbon-Based Pollutants Through the Use of Urea Solutions", now abandoned, issued as U.S. Pat. No. 4,719,092, and in commonly assigned U.S. Pat. No. 4,751,065 in the name of Bowers and entitled "Reduction of Nitrogen- and Carbon-Based Pollutants", and in commonly assigned U.S. Pat. No. 4,803,059 in the name of Sullivan and Epperly and titled "Process for the Reduction of Nitrogen Oxides in An Effluent Using A Hydroxy Amino Hydrocarbon", and in commonly owned U.S. Pat. No. 4,863,705 in the name of Epperly, Sullivan and Sprague and titled "Process for the Reduction of Nitrogen Oxides In An Effluent", and in U.S. application Ser. No. 090,962, filed Aug. 28, 1987 in the name of Epperly, Sullivan & Sprague and titled "Process for the Reduction of Nitrogen oxides in an Effluent", now abandoned, the disclosures of which are all incorporated by reference. In addition, such solutions may also include an enhancer such as hexamethylenetetramine and/or ethylene glycol and/or an oxygenated hydrocarbon as taught by commonly assigned U.S. Pat. No. 4,751,065 titled "Reduction of Nitrogen- and Carbon-Based Pollutants", and U.S. Pat. No. 4,770,863 entitled "Process for the Reduction of Nitrogen Oxides in an Effluent", and U.S. Pat. No. 4,719,092 to Bowers; the disclosures all of which are incorporated herein by reference in their entireties. Another embodiment of the invention provides for treating lower temperature effluents, in the range of about 800° F. to about 1400° F. by injecting a hydrocarbon, such as ethylene glycol, furfural or hydrogen peroxide, as taught by commonly owned U.S. patent application Ser. No. 022,799, filed on Mar. 6, 1987 in the name of Sullivan and titled "Process for Reducing Nitrogen oxides in an Effluent Using a Hydro-carbon or Hydrogen Peroxide", now abandoned, the disclosure of which is hereby incorporated by reference.

The concentration of the additive compound or compounds within the effluent should be sufficient to provide a reduction in nitrogen oxide, sulfur oxide, or other designated pollutants. Typically, in the case of a urea, ammonia, or nitrogenated hydrocarbon solution for lowering $NO_x$, the active compound will be employed at a molar ratio of nitrogen in the additive compound to the baseline nitrogen oxide level in the effluent of about 1:10 to 5:1, and will more preferably be within the range of about 1:4 to 3:2. In the case of a hydrocarbon solution, the active compound will be employed to provide a weight ratio of hydrocarbon in the treatment fluid to the nitrogen oxide level in the effluent of about 0.05:1 to about 25:1. The exact concentration of this component, however, will depend upon the overall economics of the process, and must further take into account the size of the droplets, the ability of the injector to uniformly disperse the droplets, and the life of the droplets within the effluent under the high temperature conditions existing therein.

When sulfur-containing fuels are burned, and the effluent is treated with urea for $NO_x$ reduction, it is important to reduce the level of ammonia in the final effluent by employing an oxygenated-material, especially an oxygenated hydrocarbon, preferably as part of the urea solution as taught in commonly assigned U.S. Pat. No. 4,719,092. Free ammonia may otherwise react with the sulfur-containing combustion products to produce ammonium sulfate and/or bisulfate which precipitate as a solid and can rapidly reduce the efficiency of the heat exchange apparatus associated with the boiler; furthermore, any unreacted ammonia is itself an undesirable effluent component.

The injector of the present invention is particularly useful in treating lower temperature effluents in the range of about 800° F. to about 1400° F. using a hydrocarbon or oxygenated hydrocarbon treatment fluid as disclosed in U.S. application Ser. No. 022,799, now abandoned.

Aqueous solutions are typical due to their economy and can be employed with suitable effectiveness in many situations. The effective solutions will vary from saturated to dilute. While water will be an effective solvent for most applications, there are instances where other solvents may be advantageous in combination with water.

The treatment fluid should be dispersed uniformly within effluent stream at a point where the effluent is at a temperature effective for pollutant reduction employing the desired additive at a particular concentration and droplet size.

Preferably, treatment fluid is injected at a number of spaced positions in a manner effective to uniformly form and disperse droplets of treatment fluid within the flowing effluent stream to achieve uniform mixing.

A multi stage process for reducing the concentration of nitrogen oxides in the effluent from the combustion of a carbonaceous fuel involves injecting a first treatment fluid comprising urea, ammonia or a nitrogenated hydrocarbon or mixtures thereof into the effluent at a first temperature zone where the effluent is at a temperature of between about 1350° F. to about 2220° F.; and injecting a second treatment fluid comprising a hydrocarbon into the effluent at a second temperature zone when the effluent is at a temperature of between about 800° F. to about 1400° F. The second injection step would comprise (i) positioning an injector within the effluent passage, said injector including an atomization conduit having an injector nozzle at one end thereof and having at least one jet penetrating the wall of said atomization conduit upstream of said nozzle, and a supply conduit for supplying said second treatment fluid to said at least one jet; and (ii) supplying through said supply conduit and through said at least one jet said second treatment fluid; and (iii) supplying a carrier and atomization fluid through said atomization conduit to inject said second treatment fluid into said effluent passage.

The use of the process and apparatus of the present invention in a multistage effluent treatment system is shown in the following example:

EXAMPLE 1

A utility boiler, shown schematically in FIG. 1, as 60, is fired with brown coal at a supply rate equal to about 145MW of generated electricity, with an excess of oxygen of 7%. A flue gas monitor 62 having a probe located adjacent the exit of the effluent passage measures the concentration of pollutants in the effluent.

An injector 21 of the present invention as shown in FIGS. 2 and 3, comprising: an atomization conduit having a ½ inch diameter and a ⅜ inch inner tube diameter, with two jets 42 each ⅛ inch in diameter penetrating the atomization conduit six inches upstream of the nozzle tip 41, and a supply conduit having an inner diameter of 3 inches coaxial with and disposed around the atomization conduit, is inserted through a port in the boiler wall. The injector is inserted such that the nozzle tip 41 extends about 12 inches into the interior of the effluent passage. The point of insertion corresponds to that shown in FIG. 1, downstream of boiler tubes 66, where the temperature is determined to be 1184° F.

A treatment fluid comprising a mixture of ethylene glycol and molasses is prepared and injected through the injector of the present invention, using air as an atomization fluid supplied at the rate of about 14 SCFM, as determined by a flow meter, at a velocity of about 470 feet per second. The treatment fluid is provided at a rate of about 200 gallons per hour and passes through jets 42 at a linear velocity of about 44 feet per second.

The spray pattern of the injected solution shows a conical first section having a dispersion angle of about 20 degrees and which extends for about five feet from the tip of the nozzle into the effluent passageway, and a cylindrical second section which extends beyond the first conical section to about five feet. The $NO_x$ concentration in the effluent is reduced from 120 to 107 ppm, a reduction of 11%.

While a preferred embodiment of the present invention has been described above and illustrated in the accompanying drawings, it is understood that other embodiments are within the contemplation of the inventor and the invention is not limited to the embodiments shown. In particular, the present invention may be used to treat effluents in high temperature and high pollutant zones as well as in lower temperature and lower pollutant zones.

I claim:

1. A multistage process for reducing the concentration of nitrogen oxides in an effluent passage containing effluent from the combustion of carbonaceous material in a boiler, using in a second stage an injector including an atomization conduit and a supply conduit, said atomization conduit having an inner diameter and an injector nozzle at one end positioned in said effluent passage, said supply conduit being operably connected with said atomization conduit by at least one jet penetrating the wall of said atomization conduit upstream of said nozzle; the process comprising:
   (a) in a first stage, injecting a first treatment fluid comprising urea, ammonia or a nitrogenated hydrocarbon or mixtures thereof into the effluent at a first temperature zone when the effluent is at a temperature of about 1350° F. to about 2200° F.; and
   (b) in a second stage, injecting a second treatment fluid comprising a hydrocarbon into the effluent at a second temperature zone when the effluent is at a temperature of about 800° F. to about 1400° F., wherein said step of injecting a second treatment fluid comprises
      supplying said second treatment fluid in an amount effective to reduce pollutants in said effluent through said supply conduit and through said at least one jet into said atomization conduit at a velocity of between about two to about sixty feet per second at a distance upstream of said nozzle of up to about thirty-two times the inner diameter of said atomization conduit;
      simultaneously supplying an atomization fluid through said atomization conduit to contact said second treatment fluid and inject said second treatment fluid into said effluent passage.

2. A process according to claim 1 wherein the said second treatment fluid is supplied through said at least one jet upstream of said nozzle at a distance equal to about five to about sixteen times the inner diameter of said atomization conduit.

3. A process according to claim 1 wherein said second treatment fluid is supplied through said at least one jet at a distance upstream of said nozzle equal to about sixteen times to about thirty-two times the inner diameter of said atomization conduit.

4. A process according to claim 1 wherein said second treatment fluid is supplied through said at least one jet at a distance upstream of said nozzle equal to about sixteen times the inner diameter of said atomization conduit.

5. A process according to claim 1 wherein a plurality of jets are provided to connect the atomization conduit and the supply conduit, further comprising the step of impinging streams of treatment fluid with each other.

6. A process according to claim 1 wherein said atomization fluid is supplied at a velocity of about 200 to about 800 feet per second.

7. A process for reducing the concentration of pollutants in an effluent passage containing effluent from the combustion of carbonaceous material in a boiler, using an injector including an atomization conduit and a supply conduit, said atomization conduit having an inner diameter and an injector nozzle at one end positioned in said effluent passage, said supply conduit being operably connected with said atomization conduit by at least one jet penetrating the wall of said atomization conduit upstream of said nozzle; the process comprising:
   supplying an effluent treatment fluid effective to reduce pollutants in said effluent through said supply conduit and through said at least one jet and into said atomization conduit at a velocity of between about two to about sixty feet per second at a distance upstream of said nozzle of up to about thirty-two times the inner diameter of said atomization conduit;
   simultaneously supplying an atomization fluid through said atomization conduit to contact said effluent treatment fluid and inject said effluent treatment fluid into said effluent passage.

8. A process according to claim 7 wherein the temperature of said effluent is between about 1350° F. to about 2200° F. and said effluent treatment fluid comprises as an additive urea, ammonia, or a nitrogenated hydrocarbon in amounts sufficient to supply a molar ratio of nitrogen in the treatment fluid to nitrogen oxides in said effluent of about 1:10 to about 5:1.

9. A process according to claim 7 wherein the temperature of said effluent is between about 800° F. to about 1400° F. and said effluent treatment fluid comprises as an additive a hydrocarbon in amounts sufficient to provide a weight ratio of hydrocarbon in said treatment fluid to nitrogen oxides in said effluent of about 0.5:1 to about 25:1.

10. A process according to claim 8 wherein said treatment fluid further comprises hexamethylenetetramine.

11. A process according to claim 8 wherein said treatment fluid further comprises an oxygenated hydrocarbon.

12. A process according to claim 7 wherein said effluent treatment fluid is supplied through said at least one jet at a distance upstream of said nozzle equal to about five to about sixteen times the inner diameter of said atomization conduit.

13. A process according to claim 7 wherein said effluent treatment fluid is supplied through said at least one jet at a distance upstream of said nozzle equal to about sixteen times to about thirty-two times the inner diameter of said atomization conduit.

14. A process according to claim 7 wherein said effluent treatment fluid is supplied through said at least one jet at a distance upstream of said nozzle equal to about sixteen times the inner diameter of said atomization conduit.

15. A process according to claim 7 wherein a plurality of jets are provided to connect the atomization conduit and the supply conduit, further comprising the step of impinging streams of treatment fluid with each other.

16. A process according to claim 7 wherein said atomization fluid is supplied at a velocity of about 200 to about 800 feet per second.

* * * * *

UNITED STATES PATENT AND TRADEMARK OFFICE
CERTIFICATE OF CORRECTION

PATENT NO. : 4,985,218
DATED : January 15, 1991
INVENTOR(S) : DeVita

It is certified that error appears in the above—identified patent and that said Letters Patent is hereby corrected as shown below:

At Col. 6, line 49, "issued as U.S. Pat. No. 4,719,092," should be deleted.

Signed and Sealed this

Fourth Day of August, 1992

Attest:

DOUGLAS B. COMER

Attesting Officer

Acting Commissioner of Patents and Trademarks